United States Patent

Sirrenberg et al.

[11] 3,856,892
[45] Dec. 24, 1974

[54] O-(1-METHYL-2-ALKYLMERCAPTO-VINYL)-PHOSPHORIC ACID ESTER AMIDES

[75] Inventors: Wilhelm Sirrenberg, Sprockhovel; Ingeborg Hammann, Koeln, both of Germany

[73] Assignee: Bayer Aktiengesellschaft, Leverkusen, Germany

[22] Filed: Jan. 31, 1973

[21] Appl. No.: 328,217

[30] Foreign Application Priority Data
Feb. 2, 1972   Germany............................ 2204770

[52] U.S. Cl......... 260/948, 260/247.1, 260/293.85, 260/326.84, 260/973, 260/984, 424/200, 424/216
[51] Int. Cl............................. A01n 9/36, C07f 9/24
[58] Field of Search..................................... 260/948

[56] References Cited
UNITED STATES PATENTS
2,954,320  9/1960  Gilbert et al................... 260/948 X
3,670,057  6/1972  Tsuchiya et al.................... 260/948

*Primary Examiner*—Lorraine A. Weinberger
*Assistant Examiner*—Richard L. Raymond
*Attorney, Agent, or Firm*—Burgess, Dinklage & Sprung

[57] ABSTRACT

O-(1-methyl-2-alkylmercapto-vinyl)-phosphoric acid ester amides of the formula

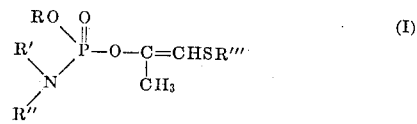

in which
R is alkyl of up to 12 carbon atoms optionally substituted by phenyl or cycloalkyl, halo-lower alkyl, alkoxyalkyl of up to 6 carbon atoms in each alkyl radical, alkenyl of up to 6 carbon atoms, phenyl, cycloalkyl or cycloalkenyl,
R''' is alkyl of up to 6 carbon atoms, and
R' and R'' each independently is hydrogen, lower alkyl optionally substituted by phenyl or cycloalkyl, lower alkenyl, alkoxyalkyl of up to 6 carbon atoms in each alkyl radical, phenyl, or cycloalkyl, or
R' and R'' jointly with the nitrogen atom form a heterocyclic ring,
which possess insecticidal, acaricidal and rodenticidal properties.

7 Claims, No Drawings

O-(1-METHYL-2-ALKYLMERCAPTO-VINYL)-PHOSPHORIC ACID ESTER AMIDES

The present invention relates to and has for its objects the provision of particular new O-(1-methyl-2-alkylmercapto-vinyl)-phosphoric acid ester amides, i.e. O-(alkyl, aryl or alkenyl)-O-(1-methyl-2-alkylmercapto-vinyl)phosphoric acid ester amides wherein the nitrogen atom may be substituted with alkyl, aryl, alkenyl or alkoxyalkyl or form part of a heterocyclic ring, which possess insecticidal, acaricidal and rodenticidal properties, active compositions in the form of mixtures of such compounds with solid and liquid dispersible carrier vehicles, and methods for producing such compounds and for using such compounds in a new way especially for combating pests, e.g. insects, acarids and rodents, especially insects and acarids, with other and further objects becoming apparent from a study of the within specification and accompanying examples.

It is known from Belgian Patent No. 702,716 that O-vinylphosphoric acid esters, such as O,O-di-isopropyl-O-(1-methyl-[Compound A] or 1-phenyl-2-isopropyl-mercapto-vinyl)[Compound B] and O,O-di-isopropyl-O-(1-methyl-2-methylmercapto-vinyl)-phosphoric acid ester [Compound C], possess insecticidal and acaricidal properties.

The present invention provides O-vinylphosphoric acid ester amides of the formula

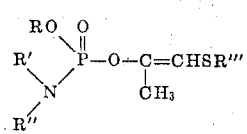 (I)

in which
R is alkyl of up to 12 carbon atoms optionally substituted by phenyl or cycloalkyl, halo-lower alkyl, alkoxyalkyl of up to 6 carbon atoms in each alkyl radical, alkenyl of up to 6 carbon atoms, phenyl, cycloalkyl or cycloalkenyl,
R''' is alkyl of up to 6 carbon atoms, and
R' and R'' each independently is hydrogen, lower alkyl optionally substituted by phenyl or cycloalkyl, lower alkenyl, alkoxyalkyl of up to 6 carbon atoms in each alkyl radical, phenyl, or cycloalkyl, or
R' and R'' jointly with the nitrogen atom form a heterocyclic ring.

The general formula (I) includes the corresponding cis-and trans-isomers of the constitutions (II) and (III) as well as mixtures of these components

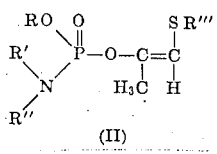 (II)   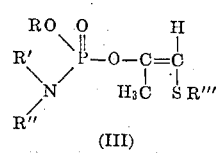 (III)

Preferably, R is straight-chain or branched alkyl with 1 to 10 carbon atoms, chloroethyl, allyl, lower alkoxy-lower alkyl with 1 to 4 carbon atoms per alkyl or alkoxy moiety, phenyl, phenyl-lower alkyl with 1 to 3 carbon atoms in the alkyl moiety, cyclopentyl, cyclohexyl, cyclohexylmethyl, cyclohexylethyl or cyclohex(1)en-4-yl-methyl, R' and R'' are hydrogen, straight-chain or branched alkyl with 1 to 4 carbon atoms, allyl, methoxyethyl, methoxypropyl, ethoxypropyl, ethoxyethyl, propoxyethyl, phenyl, benzyl, cyclohexyl, cyclohexyl-methyl or form, jointly with the nitrogen atom, a five- or six-membered ring which may be interrupted by a nitrogen, sulfur or especially an oxygen atom, and R''' is straight-chain or branched lower alkyl with 1 to 4 carbon atoms.

Surprisingly, the new O-vinylphosphoric acid ester amides show a substantially better insecticidal and acaricidal activity with, at the same time, lower toxicity to warm-blooded animals than previously known compounds of analogous constitution and direction of activity. The new active compounds according to the invention therefore represent a genuine enrichment of the art. Moreover, these compounds contribute to the reduction of the continuing requirement for new active compounds in the field of pesticides. The requirement originates partly in that, in view of questions of environment protection, ever higher demands are being made of the commercially available agents, such as low toxicity to warm-blooded animals and low phytotoxicity, rapid degradation in and on the plant in shorter minimum intervals to be observed between spraying with pesticide and harvesting, effectiveness against resistant pests, etc.

The invention also provides a process for the production of an O-vinylphosphoric acid ester amide of formula (I) in which an O-vinylphosphoric acid ester dichloride of the general formula

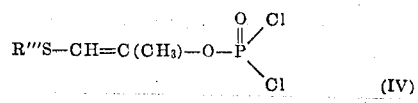 (IV)

is reacted with an alcohol of the general formula

ROH   (V)

in the form of an alkali metal, alkaline earth metal or ammonium salt or in the presence of an acid-binding agent, and the intermediate product obtained is reacted with an amine of the general formula

 (VI)

in the presence of an acid-binding agent.

In formulae (IV), (V) and (VI), R, R', R'' and R''' of course have the meanings stated above.

If O-(1-methyl-2-ethylmercapto-vinyl)-phosphoric acid ester dichloride, methanol and methylamine are used as starting materials, the reaction course can be represented by the following formula scheme:

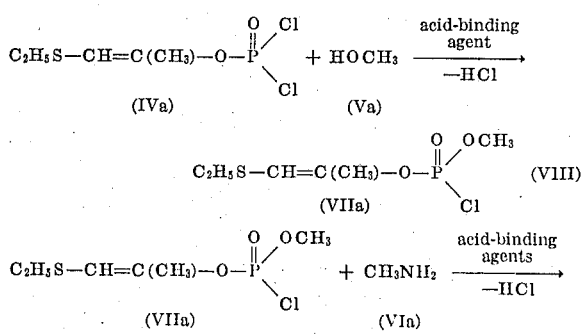

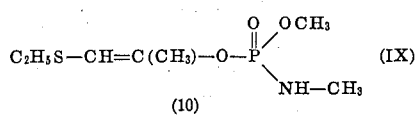

(10)

The alcohols (V) and amines (VI) required as starting materials are known from the literature and can be readily produced on an industrial scale.

As examples of alcohols and amines to be reacted according to the process, there may be mentioned: methanol, ethanol, n- or iso-propanol, n-, sec.-, iso- or tert.-butanol, pentanol, 2-methyl-butanol, hexanol, 2-ethylbutanol, 2,2-dimethylbutanol, octanol, 2-ethylhexanol, 2,2-dimethylhexanol, decanol, 2,2-dimethyloctanol, allyl-, chloromethyl-, chloroethyl-, methoxyethyl-, ethoxyethyl-, propoxyethyl-, butoxyethyl alcohol, phenol, phenethyl alcohol, methylphenylcarbinol, 1-phenylpropanol(3), cyclopentanol, cyclohexanol, β-cyclohexylethyl alcohol, cyclohexylmethanol or cyclohex(1)en-4-yl-methanol and ammonia, methyl-, dimethyl-, ethyl-, diethyl-, 2-chloro-ethyl-, n-propyl-, isopropyl, di-n-propyl-, n-butyl-, di-n-butyl-, iso-butyl, sec.-butyl-, tert.-butyl-, di-iso-butyl-, di-sec.-butyl-, di-tert.-butyl-, allyl-, diallyl-, methoxyethyl-, methoxypropyl-, ethoxypropyl-, ethoxyethyl, propoxypropyl, phenyl-, benzyl-, cyclopentyl-, cyclohexyl-, cyclohexylmethyl- or N-methyl-N-ethyl-amine, pyrrolidine, piperidine or morpholine.

The O-vinylphosphoric acid ester dichlorides (IV) required as starting materials can be prepared according to processes known in principle, for example from alkylmercaptoacetones and phosphorus oxychloride. As examples of suitable starting materials, there may be mentioned: O-(1-methyl-2-methyl- or -2-ethyl-, -2-n-propyl-, -2-iso-propyl-, -2-n-butyl-, -2-iso-butyl-, -2-sec.-butyl- or, -2-tert.-butyl-mercapto-vinyl)-phosphoric acid ester dichloride.

The process for the preparation of the new O-vinylphosphoric acid ester amides (I) is preferably carried out with the use of a solvent which term includes a mere diluent. As such, practically all inert organic solvents are suitable. Preferred solvents include aliphatic and aromatic possibly chlorinated hydrocarbons, such as benzene, toluene, xylene, benzine, methylene chloride, chloroform, carbon tetrachloride and chlorobenzene; ethers, such as diethyl and dibutyl ether and dioxane; ketones, for example acetone, methyl ethyl ketone, methyl isopropyl ketone and methyl isobutyl ketone; and nitriles, such as acetonitrile and propionitrile.

As acid acceptors, all customary acid-binding agents can be used. Particularly good results have been obtained with alkali metal carbonates and alcoholates, such as sodium and potassium carbonate, methylate or ethylate; further, aliphatic, aromatic or heterocyclic amines, for example triethylamine, dimethylamine, dimethylaniline, dimethylbenzylamine and pyridine. Finally, an excess of the amine (VI) used can also serve as the acid-binding agent.

The reaction temperature can be varied within a fairly wide range. In general, the reaction is carried out at about 0° to 100°C; preferably about 0° to 40°C in the first reaction step, and about 0° to 50°C in the second reaction step.

The reaction is, in general, carried out at normal pressure.

In carrying out the process, the reaction components are in most cases used in equimolar proportion. An excess of one or other component seems to bring no substantial advantages. In general, a solution of the alcohol (V) is added dropwise at the temperatures stated to the solution of the phosphoric acid ester dichloride (IV) in the presence of an acid-binding agent; the mixture is allowed to after-react for one to several hours and the precipitated, salt-like sediment is filtered off with suction. The filtrate is diluted with further solvent and added dropwise to a solution of the amine (VI) and new acidbinding agent. Alternatively it is possible to add the amine solution to the filtrate. After completion of the reaction, the precipitate may be filtered off with suction and the filtrate may be worked up in customary manner by washing with water, drying and distillation.

The substances according to the invention are obtained in most cases in the form of colored oils, some of which cannot be distilled without decomposition but can, by so-called "slight distillation" (that is, longer heating to moderately elevated temperatures under reduced pressure), be freed from the last volatile components and in this way can be purified. For their characterization, the refractive index is especially useful.

As already mentioned, the new O-vinylphosphoric acid ester amides are distinguished by an outstanding insecticidal and acaricidal effectiveness against crop pests, hygiene pests and pests of stored products. They possess a good activity both against sucking and eating insects, and mites (Acarina). At the same time, they exhibit a low phytotoxicity; some exhibit soil insecticidal and rodenticidal properties also.

For these reasons, the compounds according to the invention can be used with success as pesticides, particularly in crop protection.

To the sucking insects there belong, in the main, aphids (Aphidae) such as the green peach aphid (*Myzus persicae*), the bean aphid (*Doralis fabae*), the bird cherry aphid (*Rhopalosiphum padi*), the pea aphid (*Macrosiphum pisi*) and the potato aphid (*Macrosiphum solanifolii*), the currant gall aphid (*Cryptomyzus korschelti*), the rosy apple aphid (*Sappaphis mali*), the mealy plum aphid (*Hyalopterus arundinis*) and the cherry black-fly (*Myzus cerasi*); in addition, scales and mealybugs (Coccina), for example the oleander scale (*Aspidiotus hederae*) and the soft scale (*Lecanium hesperidum*) as well as the grape mealybug (*Pseudococcus maritimus*); thrips (Thysanoptera), such as *Hercinothrips femoralis*, and bugs, for example the beet bug (*Piesma quadrata*), the red cotton bug (*Dysdercus intermedius*), the bed bug (*Cimex lectularius*), the assassin bug (*Rhodnius prolixus*) and Chagas' bug (*Triatoma infestans*) and, further, cicadas, such as *Euscelis bilobatus* and *Nephotettix bipunctatus*.

In the case of the biting insects, above all there should be mentioned butterfly caterpillars (Lepidoptera) such as the diamond-back moth (*Plutella maculipennis*), the gypsy moth (*Lymantria dispar*), the brown-tail moth (*Euproctis chrysorrhoea*) and tent caterpillar (*Malacosoma neustria*); further, the cabbage moth (*Mamestra brassicae*) and the cutworm (*Agrotis segetum*); the large white butterfly (*Pieris brassicae*), the small winter moth (*Cheimatobia brumata*), the green oak tortrix moth (*Tortrix viridana*), the fall armyworm (*Laphygma frugiperda*) and cotton worm (*Prodenia litura*), the ermine moth (*Hyponomeuta padella*), the Mediterranean flour moth (*Ephestia kuhniella*) and greater wax moth (*Galleria mellonella*).

Also to be classed with the biting insects are beetles (Coleoptera), for example the granary weevil (*Sitophilus granarius = Calandra granaria*), the Colorado beetle (*Leptinotarsa decemlineata*), the dock beetle (*Gastrophysa viridula*), the mustard beetle (*Phaedon cochleariae*), the blossom beetle (*Meligethes aeneus*), the raspberry beetle (Byturus tomentosus), the bean weevil (*Bruchidius = Acanthoscelides obtectus*), the leather beetle (*Dermestes frischi*), the khapra beetle (*Trogoderma granarium*), the flour beetle (*Tribolium castaneum*), the northern corn billbug (*Calandra* or *Sitophilus zeamais*), the drugstore beetle (*Stegobium paniceum*), the yellow mealworm (*Tenebrio molitor*) and the saw-toothed grain beetle (*Oryzaephilus surinamensis*), and also species living in the soil, for example wireworms (*Agriotes spec.*) and larvae of the cockchafer (*Melolontha melolontha*); cockroaches, such as the German cockroach (*Blattella germanica*), American cockroach (*Periplaneta americana*), Madeira cockroach (*Leucophaea* or *Rhyparobia maderae*), oriental cockroach (*Blatta orientalis*), the giant cockroach (*Blaberus giganteus*) and the black giant cockroach (*Blaberus fuscus*) as well as *Henschoutedenia flexivitta*; further, Orthoptera, for example the house cricket (*Acheta domesticus*); termites such as the eastern subterranean termite (*Reticulitermes flavipes*) and Hymenoptera such as ants, for example the garden ant (*Lasius niger*).

The Diptera comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia regina*) and bluebottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*).

With the mites (Acari) there are classed, in particular, the spider mites (Tetranychidae) such as the two-spotted spider mite (*Tetranychus urticae*) and the European red mite (*Paratetranychus pilosus = Panonychus ulmi*), gall mites, for example the black currant gall mite (*Eriophyes ribis*) and tarsonemids, for example the broad mite (*Hemitarsonemus latus*) and the cyclamen mite (*Tarsonemus pallidus*); finally, ticks, such as the relapsing fever tick (*Ornithodorus moubata*).

When applied against hygiene pests and pests of stored products, particularly flies and mosquitoes, the new compounds are also distinguished by an outstanding residual activity on wood and clay, as well as a good stability to alkali on limed substrates.

The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as freon; inert dispersible liquid diluent carriers, including inert organic solvents, such as aromatic hydrocarbons (e.g. benzene, toluene, xylene, alkyl naphthalenes, etc.), halogenated, especially chlorinated, aromatic hydrocarbons (e.g. chlorobenzenes, etc.), cycloalkanes (e.g. cyclohexane, etc.), paraffins (e.g. petroleum or mineral oil fractions), chlorinated aliphatic hydrocarbons (e.g. methylene chloride, chloroethylenes, etc.), alcohols (e.g. methanol, ethanol, propanol, butanol, glycol, etc.) as well as ethers and esters thereof (e.g. glycol monomethyl ether, etc.), amines (e.g. ethanolamine, etc.), amides (e.g. dimethyl formamide, etc.), sulfoxides (e.g. dimethyl sulfoxide, etc.), acetonitrile, ketones (e.g. acetone, methyl ethyl ketone, methyl isobutyl ketone, cyclohexanone, etc.), and/or water; as well as inert dispersible finely divided solid carriers, such as ground natural minerals (e.g. kaolins, clays, alumina, silica, chalk, i.e. calcium carbonate, talc, attapulgite, montmorillonite, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfates, alkyl sulfonates, aryl sulfonates, albumin hydrolyzates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other insecticides, acaricides and rodenticides, or fungicides, bactericides, nematocides, herbicides, fertilizers, growth-regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0001–10%, preferably 0.01–1%, by weight of the mixture. Thus, the present invention contemplates over-all compositions which comprises mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0001–95%, and preferably 0.01–95%, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 15 to 1000 g/hectare, preferably 40 to 600 g/hectare, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

Furthermore, the present invention contemplates methods of selectively killing, combating or controlling pests, e.g. insects, acarids and rodents, and more particularly methods of combating at least one of insects and acarids, which comprises applying to at least one of correspondingly (a) such insects, (b) such acarids, (c) such rodents, and (d) the corresponding habitat thereof, i.e. the locus to be protected, a correspondingly combative or toxic amount, i.e. an insecticidally, acaricidally or rodenticidally effective amount, of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The synthesis, unexpected superiority and outstanding activity of the particular new compounds of the present invention are illustrated, without limitation, by the following examples:

EXAMPLE 1 a. Preparation of the O-vinylphosphoric acid ester dichlorides (IV) required as starting materials can take place for example according to the following method:

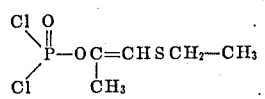

To a solution of 118.2 g (1 mole) ethylpropan-2-onesulfide and 154 g phosphorus oxychloride in 600 ml benzene there were added dropwise, at 0° to 10°C, 102 g triethylamine dissolved in 150 ml benzene, and the mixture was stirred for 25 hours at room temperature. The precipitated, salt-like sediment was filtered off with suction and the filtrate was concentrated under reduced pressure. From the residue there was obtained by distillation 101 g (68.5% of theory) of pure O-(1-methyl-2-ethylmercapto-vinyl)-phosphoric acid ester dichloride with the boiling point 120°C/8 mm Hg and the refractive index $n_D^{20} = 1.5058$.

In analogous manner, the following starting compounds were prepared:

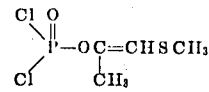

b.p. 107°C/6 mm Hg; $n_D^{20} = 1.5128$; yield: 43.5% of theory.

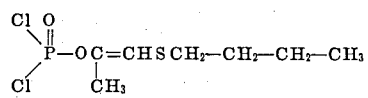

b.p. 100°C/0.01 mm Hg; $n_D^{20} = 1.5016$; yield: 22.6% of theory.

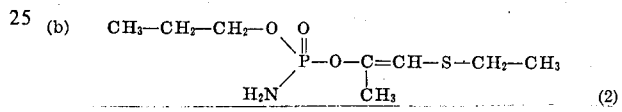

(2)

To a solution of 58.8 g (0.25 mole) O-(1-methyl-2-ethylmercapto-vinyl)-phosphoric acid ester dichloride in 300 ml benzene there was added dropwise at 0° to 10°C a solution of 15 g n-propanol and 26 g triethylamine in 100 ml benzene. After completion of the addition, the mixture was stirred for a further 1 hour at 40°C and the precipitated, salt-like sediment was separated off. 300 ml benzene were added to the filtrate. Subsequently, 38 g of aqueous ammonia solution with a content of 0.55 mole of NH₃ were added dropwise to the reaction mixture. The mixture was stirred for a further 1 hour at 20° to 30°C; the aqueous layer was then separated off, the benzene phase was washed three times with about 300 to 500 ml of water and subsequently dried. After the solvent had been distilled off, there were obtained 27 g (45% of theory) of O-n-propyl-O-(1-methyl-2-ethylmercapto-vinyl)-phosphoric acid ester amide as oil with the boiling point 160° to 162°C/0.01 mm Hg and refractive and the $n_D^{20} = 1.4910$.

EXAMPLE 2

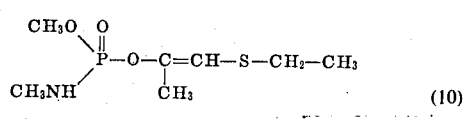

(10)

A mixture of 9 g methanol and 26 g triethylamine in 50 ml benzene was added dropwise at 0 to 10°C to a solution of 58.8 g (0.25 mole) O-(1-methyl-2-ethylmercapto-vinyl)-phosphoric acid ester dichloride in 300 ml benzene. The mixture was stirred for 1 hour at 30°C and the precipitated, salt-like sediment was subsequently filtered off with suction. The filtrate was added dropwise at 0° to 10°C to a solution of 9 g methylamine and 26 g triethylamine in 300 ml benzene; the mixture was afterwards stirred for one hour at 30°C, the precipitated triethylammonium hydrochloride was filtered off with suction and the filtrate was concentrated under reduced pressure. The oil remaining behind was purified by distillation. There were obtained 46 g (81.5% of theory) of the desired O-methyl-O-(1-methyl-2-ethylmercapto-vinyl)-phosphoric acid ester N-methylamide with the boiling point 143°C/0.15 mm Hg and the refractive index $n_D^{20} = 1.4912$.

EXAMPLE 3

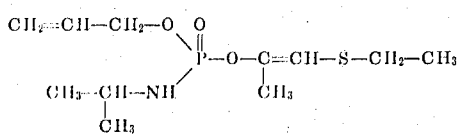
(63)

To a solution of 58.8 g (0.25 mole) O-(1-methyl-2ethylmercapto-vinyl)-phosphoric acid ester dichloride in 300 ml benzene there were added dropwise, at 0 to 10°C, 15 g allyl alcohol and 26 g triethylamine dissolved in 50 ml benzene. In order to complete the reaction, the mixture was afterwards stirred for 1 hour at 30°C and the precipitated, salt-like sediment was subsequently filtered off with suction. The filtrate was added dropwise at 0° to 10°C to a solution of 17 g isopropylamine and 26 g triethylamine in 300 ml benzene. The mixture was then stirred for a further hour at 30 to 40°C and the precipitated triethylammonium hydrochloride was separated off. The filtrate was washed several times with water and it was dried over sodium sulfate. After the solvent had been distilled off, there remained behind 43 g (61.5% of theory) of O-allyl-O-(1-methyl-2-ethylmercapto-vinyl)-phosphoric acid ester N-isopropylamide in the form of an oil which could, if necessary, be distilled. B.p. 148°C/0.01 mm Hg; $n_D^{20} = 1.4861$.

There are listed in the following Table 1 the foregoing compounds along with others which were prepared in analogous manner:

TABLE 1

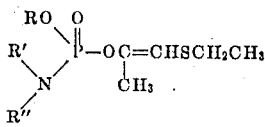

| Compound | R | R' | R'' | B.P. ° C., M.P. ° C. | $n_D^{20}$ | Percent yield |
|---|---|---|---|---|---|---|
| 1 | $C_2H_5$ | H | H | Slightly distilled | 1.4950 | 37.5 |
| 2 | $nC_3H_7$ | H | H | 160–62/0.01 mm. Hg | 1.4910 | 45.0 |
| 3 | $iC_3H_7$ | H | H | Slightly distilled | 1.4909 | 53.5 |
| 4 | $nC_4H_9$ | H | H | ---do--- | 1.4879 | 79.0 |
| 5 | sec. $C_4H_9$ | H | H | ---do--- | 1.4905 | 74.0 |
| 6 | $iC_4H_9$ | H | H | ---do--- | 1.4873 | 79.0 |
| 7 | $nC_5H_{11}$ | H | H | ---do--- | 1.4869 | 76.5 |
| 8 | $nC_6H_{13}$ | H | H | ---do--- | 1.4841 | 88.0 |
| 9 | $nC_7H_{15}$ | H | H | ---do--- | 1.4808 | 52.5 |
| 10 | $CH_3$ | H | $CH_3$ | 143/0.15 mm. Hg | 1.4912 | 81.5 |
| 11 | $C_2H_5$ | H | $CH_3$ | 143/0.15 mm. Hg | 1.4869 | 70.0 |
| 12 | $CH_3OCH_2CH_2$ | H | $CH_3$ | 164/0.01 mm. Hg | 1.4849 | 53.5 |
| 13 | $CH_3CH_2OCH_2CH_2$ | H | $CH_3$ | 168–170/0.01 mm. Hg | 1.4831 | 42.0 |
| 14 | $CH_3CH_2CH_2OCH_2CH_2$ | H | $CH_3$ | 170–172/0.01 mm. Hg | 1.4800 | 40.0 |
| 15 | $CH_3CH_2CH_2CH_2OCH_2CH_2$ | H | $CH_3$ | 184–186/0.1 mm. Hg | 1.4768 | 45.0 |
| 16 | $nC_3H_7$ | H | $CH_3$ | 146–148/0.01 mm. Hg | 1.4808 | 53.5 |
| 17 | $iC_3H_7$ | H | $CH_3$ | 146/0.15 mm. Hg | 1.4829 | 71.0 |
| 18 | $CH_2=CHCH_2$ | H | $CH_3$ | 148–150/0.01 mm. Hg | 1.4929 | 44.5 |
| 19 | $nC_4H_9$ | H | $CH_3$ | 149–150/0.1 mm. Hg | 1.4830 | 76.5 |
| 20 | $iC_4H_9$ | H | $CH_3$ | 160–162/0.25 mm. Hg | 1.4788 | 54.0 |
| 21 | sec. $C_4H_9$ | H | $CH_3$ | 154/0.1 mm. Hg | 1.4795 | 60.0 |
| 22 | $nC_7H_{15}$ | H | $CH_3$ | 178–180/0.01 mm. Hg | 1.4758 | 72.5 |
| 23 |  | H | $CH_3$ | 173–174/0.01 mm. Hg | 1.5366 | 65.5 |
| 24 | 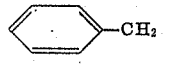—$CH_2$— | H | $CH_3$ | Slightly distilled | 1.5355 | 79.5 |
| 25 | 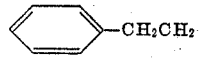—$CH_2CH_2$— | H | $CH_3$ | 198/0.01 mm. Hg | 1.5297 | 63.5 |
| 26 | 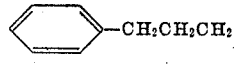—$CH_2CH_2CH_2$— | H | $CH_3$ | 210/0.1 mm. Hg | 1.5259 | 69.0 |
| 27 | 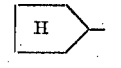- | H | $CH_3$ | 171/0.01 mm. Hg | 1.4988 | 47.0 |
| 28 | 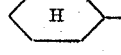- | H | $CH_3$ | 172–174/0.01 mm. Hg | 1.5001 | 60.0 |
| 29 | 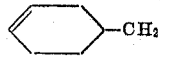—$CH_2$ | H | $CH_3$ | 186/0.01 mm. Hg | 1.5079 | 63.0 |
| 30 | 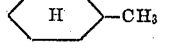—$CH_3$ | H | $CH_3$ | 182–184/0.01 mm. Hg | 1.4881 | 62.5 |
| 31 | $CH_3$ | H | $C_2H_5$ | 138–142/0.01 mm. Hg | 1.4877 | 10.0 |
| 32 | $C_2H_5$ | H | $C_2H_5$ | 148/0.01 mm. Hg | 1.4812 | 47.0 |
| 33 | $ClCH_2CH_2$ | H | $C_2H_5$ | 168/0.01 mm. Hg | 1.4953 | 69.5 |
| 34 | $CH_3OCH_2CH_2$ | H | $C_2H_5$ | 156/0.01 mm. Hg | 1.4837 | 56.5 |
| 35 | $CH_3CH_2CH_2CH_2OCH_2CH_2$ | H | $C_2H_5$ | 178/0.01 mm. Hg | 1.4748 | 66.5 |
| 36 | $nC_3H_7$ | H | $C_2H_5$ | 144–146/0.01 mm. Hg | 1.4769 | 63.0 |
| 37 | $iC_3H_7$ | H | $C_2H_5$ | 136/0.01 mm. Hg | 1.4765 | 72.0 |
| 38 | $CH_2=CHCH_2$ | H | $C_2H_5$ | Slightly distilled | 1.4916 | 72.5 |

TABLE 1 — Continued

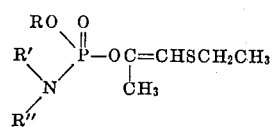

| Compound | R | R' | R'' | B.P. °C., M.P. °C. | $n_D^{20}$ | Percent yield |
|---|---|---|---|---|---|---|
| 39 | nC$_4$H$_9$ | H | C$_2$H$_5$ | 142/0.01 mm. Hg | 1.4792 | 62.5 |
| 40 | sec·C$_4$H$_9$ | H | C$_2$H$_5$ | 143/0.01 mm. Hg | 1.4770 | 66.5 |
| 41 | iC$_4$H$_9$ | H | C$_2$H$_5$ | 142–143/0.01 mm. Hg | 1.4742 | 71.0 |
| 42 | nC$_5$H$_{11}$ | H | C$_2$H$_5$ | 165/0.01 mm. Hg | 1.4742 | 72.0 |
| 43 | nC$_6$H$_{13}$ | H | C$_2$H$_5$ | 162–164/0.01 mm. Hg | 1.4747 | 67.0 |
| 44 | iC$_5$H$_{11}$ | H | C$_2$H$_5$ | 150/0.01 mm. Hg | 1.4745 | 72.0 |
| 45 | C$_{10}$H$_{21}$ | H | C$_2$H$_5$ | 212/0.01 mm. Hg | 1.4732 | 49.0 |
| 46 | phenyl | H | C$_2$H$_5$ | 176/0.01 mm. Hg | 1.5310 | 61.0 |
| 47 | cyclohexyl-CH$_2$CH$_2$ | H | C$_2$H$_5$ | Slightly distilled | 1.4939 | 88.0 |
| 48 | CH$_3$ | H | CH$_3$CH$_2$CH$_2$ | 136/0.01 mm. Hg | 1.4846 | 49.0 |
| 49 | C$_2$H$_5$ | H | CH$_3$CH$_2$CH$_2$ | 132–134/0.01 mm. Hg | 1.4800 | 85.0 |
| 50 | ClCH$_2$CH$_2$ | H | CH$_3$CH$_2$CH$_2$ | 168–170/0.01 mm. Hg | 1.4962 | 49.0 |
| 51 | CH$_3$CH$_2$CH$_2$CH$_2$OCH$_2$CH$_2$ | H | CH$_3$CH$_2$CH$_2$ | 180/0.1 mm. Hg | 1.4749 | 60.0 |
| 52 | nC$_3$H$_7$ | H | CH$_3$CH$_2$CH$_2$ | 143/0.01 mm. Hg | 1.4786 | 75.0 |
| 53 | iC$_3$H$_7$ | H | CH$_3$CH$_2$CH$_2$ | 144/0.01 mm. Hg | 1.4767 | 51.0 |
| 54 | CH$_3$ | H | nC$_4$H$_9$ | 140/0.01 mm. Hg | 1.4829 | 48.0 |
| 55 | C$_2$H$_5$ | H | nC$_4$H$_9$ | 138–140/0.01 mm. Hg | 1.4782 | 71.0 |
| 56 | nC$_3$H$_7$ | H | nC$_4$H$_9$ | 162/0.01 mm. Hg | 1.4781 | 69.0 |
| 57 | iC$_3$H$_7$ | H | nC$_4$H$_9$ | 142/0.3 mm. Hg | 1.4752 | 69.0 |
| 58 | CH$_3$ | H | iC$_3$H$_7$ | 136/0.01 mm. Hg | 1.4835 | 56.5 |
| 59 | C$_2$H$_5$ | H | iC$_3$H$_7$ | 133/0.01 mm. Hg | 1.4799 | 68.5 |
| 60 | CH$_3$OCH$_2$CH$_2$ | H | iC$_3$H$_7$ | 160/0.01 mm. Hg | 1.4800 | 66.0 |
| 61 | nC$_3$H$_7$ | H | iC$_3$H$_7$ | 148/0.1 mm. Hg | 1.4772 | 65.5 |
| 62 | iC$_3$H$_7$ | H | iC$_3$H$_7$ | 139/0.1 mm. Hg | 1.4747 | 65.5 |
| 63 | CH$_2$=CHCH$_2$ | H | iC$_3$H$_7$ | 148/0.01 mm. Hg | 1.4861 | 61.5 |
| 64 | nC$_4$H$_9$ | H | iC$_3$H$_7$ | 146/0.01 mm. Hg | 1.4731 | 73.0 |
| 65 | sec.C$_4$H$_9$ | H | iC$_3$H$_7$ | 143/0.1 mm. Hg | 1.4751 | 70.5 |
| 66 | iC$_4$H$_9$ | H | iC$_3$H$_7$ | 142/0.01 mm. Hg | 1.4732 | 69.0 |
| 67 | (CH$_3$CH$_2$)$_2$CHCH$_2$ | H | iC$_3$H$_7$ | 158/0.01 mm. Hg | 1.4750 | 65.5 |
| 68 | nC$_5$H$_{11}$ | H | iC$_3$H$_7$ | 157/0.15 mm. Hg | 1.4745 | 71.0 |
| 69 | nC$_6$H$_{13}$ | H | iC$_3$H$_7$ | 164/0.15 mm. Hg | 1.4734 | 66.5 |
| 70 | iC$_5$H$_{11}$ | H | iC$_3$H$_7$ | 156/0.01 mm. Hg | 1.4739 | 68.5 |
| 71 | nC$_7$H$_{15}$ | H | iC$_3$H$_7$ | 168/0.01 mm. Hg | 1.4725 | 63.0 |
| 72 | CH$_3$ | H | iC$_4$H$_9$ | 132–134/0.01 mm. Hg | 1.4828 | 64.0 |
| 73 | C$_2$H$_5$ | H | iC$_4$H$_9$ | 128–130/0.01 mm. Hg | 1.4770 | 74.0 |
| 74 | nC$_3$H$_7$ | H | iC$_4$H$_9$ | 159/0.01 mm. Hg | 1.4762 | 50.0 |
| 75 | iC$_3$H$_7$ | H | iC$_4$H$_9$ | 150/0.1 mm. Hg | 1.4740 | 71.5 |
| 76 | CH$_3$ | H | sec. C$_4$H$_9$ | 142/0.01 mm. Hg | 1.4830 | 34.0 |
| 77 | C$_2$H$_5$ | H | sec. C$_4$H$_9$ | 136/0.01 mm. Hg | 1.4730 | 65.5 |
| 78 | nC$_3$H$_7$ | H | sec. C$_4$H$_9$ | 150/0.3 mm. Hg | 1.4768 | 69.0 |
| 79 | iC$_3$H$_7$ | H | sec. C$_4$H$_9$ | 152/0.5 mm. Hg | 1.4752 | 61.0 |
| 80 | CH$_3$ | CH$_3$ | CH$_3$ | 104/0.01 mm. Hg | 1.4805 | 62.0 |
| 81 | C$_2$H$_5$ | CH$_3$ | CH$_3$ | 98–100/0.01 mm. Hg | 1.4765 | 69.5 |
| 82 | nC$_3$H$_7$ | CH$_3$ | CH$_3$ | 106/0.01 mm. Hg | 1.4739 | 75.0 |
| 83 | iC$_3$H$_7$ | CH$_3$ | CH$_3$ | 104/0.01 mm. Hg | 1.4732 | 58.5 |
| 84 | CH$_3$ | C$_2$H$_5$ | C$_2$H$_5$ | 122/0.01 mm. Hg | 1.4805 | 63.0 |
| 85 | C$_2$H$_5$ | C$_2$H$_5$ | C$_2$H$_5$ | 120/0.01 mm. Hg | 1.4759 | 61.0 |
| 86 | ClCH$_2$CH$_2$ | C$_2$H$_5$ | C$_2$H$_5$ | 138/0.01 mm. Hg | 1.4890 | 57.0 |
| 87 | CH$_3$CH$_2$CH$_2$CH$_2$OCH$_2$CH$_2$ | C$_2$H$_5$ | C$_2$H$_5$ | 158/0.01 mm. Hg | 1.4717 | 56.5 |
| 88 | nC$_3$H$_7$ | C$_2$H$_5$ | C$_2$H$_5$ | 136/0.3 mm. Hg | 1.4741 | 54.0 |
| 89 | iC$_3$H$_7$ | C$_2$H$_5$ | C$_2$H$_5$ | 130/0.3 mm. Hg | 1.4719 | 50.0 |
| 90 | CH$_3$ | nC$_3$H$_7$ | nC$_3$H$_7$ | 118–120/0.01 mm. Hg | 1.4768 | 36.5 |
| 91 | C$_2$H$_5$ | nC$_3$H$_7$ | nC$_3$H$_7$ | 136/0.3 mm. Hg | 1.4720 | 48.0 |
| 92 | CH$_3$ | H | CH$_2$=CHCH$_2$ | 156–158/0.5 mm. Hg | 1.4934 | 55.5 |
| 93 | C$_2$H$_5$ | H | CH$_2$=CHCH$_2$ | 153–154/0.3 mm. Hg | 1.4882 | 67.5 |
| 94 | nC$_3$H$_7$ | H | CH$_2$=CHCH$_2$ | 153–154/0.1 mm. Hg | 1.4871 | 64.5 |
| 95 | iC$_3$H$_7$ | H | CH$_2$=CHCH$_2$ | 154–155/0.5 mm. Hg | 1.4860 | 68.5 |
| 96 | sec. C$_4$H$_9$ | H | CH$_2$=CHCH$_2$ | 150–160/0.2–0.3 mm. Hg | 1.4840 | 34.0 |
| 97 | CH$_3$ | H | CH$_3$OCH$_2$CH$_2$ | 152–158/0.01 mm. Hg | 1.4866 | 32.5 |
| 98 | C$_2$H$_5$ | H | CH$_3$OCH$_2$CH$_2$ | 162/0.1 mm. Hg | 1.4830 | 59.0 |
| 99 | CH$_3$ | H | CH$_3$OCH$_2$CH$_2$CH$_2$ | 152–154/0.01 mm. Hg | 1.4859 | 35.0 |
| 100 | C$_2$H$_5$ | H | CH$_3$OCH$_2$CH$_2$CH$_2$ | 158/0.01 mm. Hg | 1.4837 | 37.5 |
| 101 | CH$_3$ | H | phenyl-CH$_2$ | Slightly distilled | 1.5331 | 44.0 |
| 102 | CH$_3$ | H | cyclohexyl-CH$_2$ | 170–172/0.01 mm. Hg | 1.5004 | 41.5 |
| 103 | CH$_3$ | —CH$_2$CH$_2$CH$_2$CH$_2$CH$_2$— |  | 126–128/0.01 mm. Hg | 1.4948 | 57.0 |
| 104 | C$_2$H$_5$ | —CH$_2$CH$_2$CH$_2$CH$_2$CH$_2$— |  | 144/0.01 mm. Hg | 1.4920 | 34.5 |
| 105 | CH$_3$ | —CH$_2$CH$_2$OCH$_2$CH$_2$— |  | 124–128/0.01 mm. Hg | 1.4965 | 52.5 |
| 106 | C$_2$H$_5$ | —CH$_2$CH$_2$OCH$_2$CH$_2$— |  | 158/0.01 mm. Hg | 1.4935 | 62.5 |
| 107 | CH$_3$ | —CH$_2$CH$_2$CH$_2$CH$_2$— |  | 122–124/0.01 mm. Hg | 1.4922 | 48.0 |
| 108 | C$_2$H$_5$ | —CH$_2$CH$_2$CH$_2$CH$_2$— |  | 142/0.2 mm. Hg | 1.4927 | 71.5 |

TABLE 1—Continued

| Compound | R | R' | R'' | B.P. °C., M.P. °C. | $n_D^{20}$ | Percent yield |
|---|---|---|---|---|---|---|

$$\begin{array}{c} RO \diagdown \parallel^O \\ R' \diagup P\text{—}OC\text{=}CHSCH_2CH_2CH_2CH_3 \\ \diagup N \diagdown \quad \mid \\ R'' \quad \quad CH_3 \end{array}$$

| Compound | R | R' | R'' | B.P. °C., M.P. °C. | $n_D^{20}$ | Percent yield |
|---|---|---|---|---|---|---|
| 109 | CH₃ | H | CH₃ | Slightly distilled | 1.4870 | 91.0 |
| 110 | C₂H₅ | H | CH₃ | 152–154/0.01 mm. Hg | 1.4809 | 73.5 |
| 111 | CH₃ | H | iC₃H₇ | 162/1.5 mm. Hg | 1.4810 | 54.0 |
| 112 | C₂H₅ | H | iC₃H₇ | 164/1.0 mm. Hg | 1.4760 | 65.0 |
| 113 | CH₃ | H | sec. C₄H₉ | Slightly distilled | 1.4853 | 93.0 |

$$\begin{array}{c} RO \diagdown \parallel^O \\ R' \diagup P\text{—}OC\text{=}CHSCH_3 \\ \diagup N \diagdown \quad \mid \\ R'' \quad \quad CH_3 \end{array}$$

| Compound | R | R' | R'' | B.P. °C., M.P. °C. | $n_D^{20}$ | Percent yield |
|---|---|---|---|---|---|---|
| 114 | CH₃ | H | CH₃ | 135/0.1 mm. Hg | 1.4969 | 84.0 |
| 115 | CH₃ | H | C₂H₅ | 128/0.01 mm. Hg | 1.4929 | 56.5 |
| 116 | CH₃ | H | iC₃H₇ | 125/0.1 mm. Hg | 1.4872 | 74.5 |

EXAMPLE 4

Drosophila test

Solvent: 3 parts by weight acetone
Emulsifier: 1 part by weight alkylarylpolyglycol ether To produce a suitable preparation of active compound, 1 part by weight of the active compound was mixed with the stated amount of solvent containing the stated amount of emulsifier, and the concentrate was diluted with water to the desired concentration.

1 ml of the preparation of the active compound was applied with a pipette to a filter paper disc of 7 cm diameter. The wet disc was placed in a glass vessel containing 50 vinegar flies (*Drosophila melanogaster*) and covered with a glass plate.

After the specified periods of time, the destruction was determined as a percentage: 100% means that all the flies were killed; 0% means that none of the flies were killed.

The active compounds, their concentrations, the evaluation times and the degree of destruction can be seen from the following Table 2.

TABLE 2
(Drosophila test)

| Active compound | | Concentration of active compound in percent by weight | Degree of destruction in percent after 1 day |
|---|---|---|---|
| $(iC_3H_7O)_2\overset{O}{\overset{\parallel}{P}}\text{—}O\text{—}C(\text{C}_6\text{H}_5)\text{=}CH\text{—}SC_3H_7\text{-}i$ (known) | (B) | 0.1 | 0 |
| $\begin{array}{c}CH_3O\diagdown \parallel^O \\ \diagup P\text{—}O\text{—}C\text{=}CH\text{—}SC_2H_5 \\ n\text{-}C_3H_7\text{—}NH \quad \mid \\ \quad CH_3\end{array}$ | (48) | 0.1<br>0.01<br>0.001 | 100<br>100<br>90 |
| $\begin{array}{c}CH_3O\diagdown \parallel^O \\ \diagup P\text{—}O\text{—}C\text{=}CH\text{—}SC_2H_5 \\ n\text{-}C_4H_9\text{—}NH \quad \mid \\ \quad CH_3\end{array}$ | (54) | 0.1<br>0.01<br>0.001 | 100<br>100<br>65 |
| $\begin{array}{c}CH_3O\diagdown \parallel^O \\ \diagup P\text{—}O\text{—}C\text{=}CH\text{—}SC_2H_5 \\ i\text{-}C_4H_9\text{—}NH \quad \mid \\ \quad CH_3\end{array}$ | (72) | 0.1<br>0.01<br>0.001 | 100<br>100<br>85 |
| $\begin{array}{c}CH_3O\diagdown \parallel^O \\ \diagup P\text{—}O\text{—}C\text{=}CH\text{—}SC_2H_5 \\ (CH_3)_2N \quad \mid \\ \quad CH_3\end{array}$ | (80) | 0.1<br>0.01<br>0.001 | 100<br>100<br>95 |
| $\begin{array}{c}CH_3O\diagdown \parallel^O \\ \diagup P\text{—}O\text{—}C\text{=}CH\text{—}SC_2H_5 \\ (C_3H_7)_2N \quad \mid \\ \quad CH_3\end{array}$ | (90) | 0.1<br>0.01<br>0.001 | 100<br>100<br>100 |
| $\begin{array}{c}CH_3O\diagdown \parallel^O \\ \diagup P\text{—}O\text{—}C\text{=}CH\text{—}SC_2H_5 \\ C_6H_5\text{—}CH_2\text{—}NH \quad \mid \\ \quad CH_3\end{array}$ | (101) | 0.1<br>0.01<br>0.001 | 100<br>100<br>70 |

TABLE 2—Continued

| Active compounds | | Concentration of active compound in percent by weight | Degree of destruction in percent after 1 day |
|---|---|---|---|
| 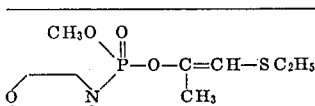 | (105) | 0.1<br>0.01<br>0.001 | 100<br>100<br>70 |
| 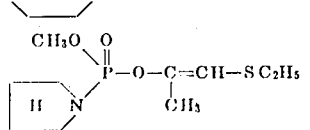 | (107) | 0.1<br>0.01<br>0.001 | 100<br>100<br>100 |

EXAMPLE 5

Myzus test (contact action)

Solvent: 3 parts by weight acetone
Emulsifier: 1 part by weight alkylarylpolyglycol ether To produce a suitable preparation of active compound, 1 part by weight of the active compound was mixed with the stated amount of solvent containing the stated amount of emulsifier and the concentrate was diluted with water to the desired concentration.

Cabbage plants (*Brassica oleracea*) which had been heavily infested with peach aphids (*Myzus persicae*) were sprayed with the preparation of the active compound until dripping wet.

After the specified periods of time, the degree of destruction was determined as a percentage: 100% means that all the aphids were killed whereas 0% means that none of the aphids were killed.

The active compounds, the concentrations of the active compounds, the evaluation times and the results can be seen from the following Table 3.

TABLE 3
(Myzus test)

| Active compounds | | Concentration of active compound in percent by weight | Degree of destruction in percent after 1 day |
|---|---|---|---|
| 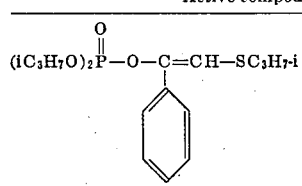<br>(known) | (B) | 0.1<br>0.01<br>0.001 | 99<br>60<br>0 |
| 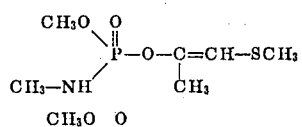 | (114) | 0.1<br>0.01<br>0.001 | 100<br>100<br>98 |
| 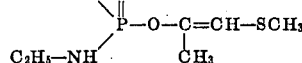 | (115) | 0.1<br>0.01<br>0.001 | 100<br>100<br>90 |
| 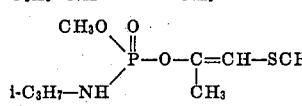 | (116) | 0.1<br>0.01<br>0.001<br>0.0001 | 100<br>100<br>90<br>40 |
| 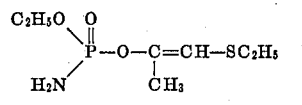 | (1) | 0.1<br>0.01<br>0.001 | 100<br>100<br>100 |
| 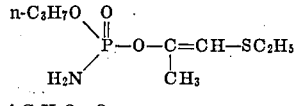 | (2) | 0.1<br>0.01<br>0.001 | 100<br>100<br>30 |
| 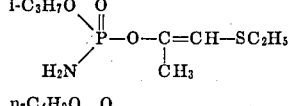 | (3) | 0.1<br>0.01<br>0.001<br>0.0001 | 100<br>100<br>98<br>30 |
| 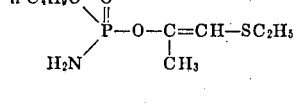 | (4) | 0.1<br>0.01<br>0.001 | 100<br>100<br>70 |

TABLE 3—Continued

| Active compounds | | Concentration of active compound in percent by weight | Degree of destruction in percent after 1 day |
|---|---|---|---|
| $\begin{array}{c} CH_3O \quad O \\ \phantom{CH_3}\diagdown\phantom{a}\|\phantom{a} \\ \phantom{CH_3-}P-O-C=CH-SC_2H_5 \\ CH_3-NH \quad\phantom{-} CH_3 \end{array}$ | (10) | 0.1<br>0.01<br>0.001 | 100<br>100<br>85 |
| $\begin{array}{c} CH_3O-CH_2-CH_2O \quad O \\ \phantom{a}\diagdown\|\phantom{a} \\ \phantom{a}P-O-C=CH-SC_2H_5 \\ CH_3-NH \quad CH_3 \end{array}$ | (12) | 0.1<br>0.01<br>0.001 | 100<br>100<br>45 |
| $\begin{array}{c} C_2H_5O-CH_2-CH_2O \quad O \\ \phantom{a}\diagdown\|\phantom{a} \\ \phantom{a}P-O-C=CH-SC_2H_5 \\ CH_3-NH \quad CH_3 \end{array}$ | (13) | 0.1<br>0.01<br>0.001 | 100<br>100<br>60 |
| $\begin{array}{c} n-C_4H_9O-CH_2O \quad O \\ \phantom{a}\diagdown\|\phantom{a} \\ \phantom{a}P-O-C=CH-SC_2H_5 \\ CH_3-NH \quad CH_3 \end{array}$ | (15) | 0.1<br>0.01<br>0.001 | 100<br>100<br>45 |
| $\begin{array}{c} n-C_3H_7O \quad O \\ \phantom{a}\diagdown\|\phantom{a} \\ \phantom{a}P-O-C=CH-SC_2H_5 \\ CH_3-NH \quad CH_3 \end{array}$ | (16) | 0.1<br>0.01<br>0.001 | 100<br>100<br>85 |
| $\begin{array}{c} CH_2=CH-CH_2O \quad O \\ \phantom{a}\diagdown\|\phantom{a} \\ \phantom{a}P-O-C=CH-SC_2H_5 \\ CH_3-NH \quad CH_3 \end{array}$ | (18) | 0.1<br>0.01<br>0.001 | 100<br>100<br>99 |
| $\begin{array}{c} n-C_4H_9O \quad O \\ \phantom{a}\diagdown\|\phantom{a} \\ \phantom{a}P-O-C=CH-SC_2H_5 \\ CH_3-NH \quad CH_3 \end{array}$ | (19) | 0.1<br>0.01<br>0.001 | 100<br>100<br>75 |
| $\begin{array}{c} CH_3 \\ \phantom{a} \| \\ C_2H_5-CHO \quad O \\ \phantom{a}\diagdown\|\phantom{a} \\ \phantom{a}P-O-C=CH-SC_2H_5 \\ CH_3-NH \quad CH_3 \end{array}$ | (21) | 0.1<br>0.01<br>0.001 | 100<br>100<br>85 |
| $\begin{array}{c} i-C_4H_9O \quad O \\ \phantom{a}\diagdown\|\phantom{a} \\ \phantom{a}P-O-C=CH-SC_2H_5 \\ CH_3-NH \quad CH_3 \end{array}$ | (20) | 0.1<br>0.01<br>0.001<br>0.0001 | 100<br>100<br>95<br>30 |
| $\begin{array}{c} n-C_7H_{15}O \quad O \\ \phantom{a}\diagdown\|\phantom{a} \\ \phantom{a}P-O-C=CH-SC_2H_5 \\ CH_3-NH \quad CH_3 \end{array}$ | (22) | 0.1<br>0.01<br>0.001 | 100<br>99<br>45 |
| $\begin{array}{c} C_6H_5-O \quad O \\ \phantom{a}\diagdown\|\phantom{a} \\ \phantom{a}P-O-C=CH-SC_2H_5 \\ CH_3-NH \quad CH_3 \end{array}$ | (23) | 0.1<br>0.01<br>0.001 | 100<br>100<br>30 |
| $\begin{array}{c} C_6H_5-CH_2O \quad O \\ \phantom{a}\diagdown\|\phantom{a} \\ \phantom{a}P-O-C=CH-SC_2H_5 \\ CH_3-NH \quad CH_3 \end{array}$ | (24) | 0.1<br>0.01<br>0.001 | 100<br>100<br>95 |
| $\begin{array}{c} \text{(cyclopentyl)}-O \quad O \\ \phantom{a}\diagdown\|\phantom{a} \\ \phantom{a}P-O-C=CH-SC_2H_5 \\ CH_3-NH \quad CH_3 \end{array}$ | (27) | 0.1<br>0.01<br>0.001 | 100<br>100<br>40 |
| $\begin{array}{c} CH_3O \quad O \\ \phantom{a}\diagdown\|\phantom{a} \\ \phantom{a}P-O-C=CH-SC_2H_5 \\ C_2H_5-NH \quad CH_3 \end{array}$ | (31) | 0.1<br>0.01<br>0.001<br>0.0001 | 100<br>100<br>85<br>25 |
| $\begin{array}{c} C_2H_5O \quad O \\ \phantom{a}\diagdown\|\phantom{a} \\ \phantom{a}P-O-C=CH-SC_2H_5 \\ C_2H_5-NH \quad CH_3 \end{array}$ | (32) | 0.1<br>0.01<br>0.001 | 100<br>100<br>98 |
| $\begin{array}{c} Cl-CH_2-CH_2O \quad O \\ \phantom{a}\diagdown\|\phantom{a} \\ \phantom{a}P-O-C=CH-SC_2H_5 \\ C_2H_5-NH \quad CH_3 \end{array}$ | (33) | 0.1<br>0.01<br>0.001 | 100<br>100<br>35 |

TABLE 3—Continued

| Active compounds | | Concentration of active compound in percent by weight | Degree of destruction in percent after 1 day |
|---|---|---|---|
| n-C$_3$H$_7$O\P(=O)(NH-C$_2$H$_5$)-O-C(CH$_3$)=CH-S C$_2$H$_5$ | (36) | 0.1<br>0.01<br>0.001 | 100<br>100<br>80 |
| i-C$_3$H$_7$O\P(=O)(NH-C$_2$H$_5$)-O-C(CH$_3$)=CH-S C$_2$H$_5$ | (37) | 0.1<br>0.01<br>0.001 | 100<br>100<br>40 |
| CH$_2$=CH-CH$_2$O\P(=O)(NH-C$_2$H$_5$)-O-C(CH$_3$)=CH-S C$_2$H$_5$ | (38) | 0.1<br>0.01<br>0.001 | 100<br>100<br>98 |
| n-C$_4$H$_9$O\P(=O)(NH-C$_2$H$_5$)-O-C(CH$_3$)=CH-S C$_2$H$_5$ | (39) | 0.1<br>0.01<br>0.001<br>0.0001 | 100<br>100<br>70<br>30 |
| sec.C$_4$H$_9$O\P(=O)(NH-C$_2$H$_5$)-O-C(CH$_3$)=CH-S C$_2$H$_5$ | (40) | 0.1<br>0.01<br>0.001 | 100<br>100<br>30 |
| i-C$_4$H$_9$O\P(=O)(NH-C$_2$H$_5$)-O-C(CH$_3$)=CH-S C$_2$H$_5$ | (41) | 0.1<br>0.01<br>0.001 | 100<br>100<br>60 |
| n-C$_5$H$_{11}$O\P(=O)(NH-C$_2$H$_5$)-O-C(CH$_3$)=CH-SC$_2$H$_5$ | (42) | 0.1<br>0.01<br>0.001 | 100<br>99<br>60 |
| i-C$_3$H$_7$-CH$_2$-CH$_2$O\P(=O)(NH-C$_2$H$_5$)-O-C(CH$_3$)=CH-SC$_2$H$_5$ | (44) | 0.1<br>0.01<br>0.001 | 100<br>98<br>40 |
| C$_6$H$_{11}$-CH$_2$-CH$_2$O\P(=O)(NH-C$_2$H$_5$)-O-C(CH$_3$)=CH-SC$_2$H$_5$ | (47) | 0.1<br>0.01<br>0.001 | 100<br>100<br>30 |
| CH$_3$O\P(=O)(NH-n-C$_3$H$_7$)-O-C(CH$_3$)=CH-SC$_2$H$_5$ | (48) | 0.1<br>0.01<br>0.001<br>0.0001 | 100<br>100<br>100<br>40 |
| Cl-CH$_2$-CH$_2$O\P(=O)(NH-n-C$_3$H$_7$)-O-C(CH$_3$)=CH-SC$_2$H$_5$ | (50) | 0.1<br>0.01<br>0.001 | 100<br>100<br>60 |
| n-C$_3$H$_7$O\P(=O)(NH-n-C$_3$H$_7$)-O-C(CH$_3$)=CH-SC$_2$H$_5$ | (52) | 0.1<br>0.01<br>0.001 | 100<br>100<br>50 |
| i-C$_3$H$_7$O\P(=O)(NH-n-C$_3$H$_7$)-O-C(CH$_3$)=CH-SC$_2$H$_5$ | (53) | 0.1<br>0.01<br>0.001 | 100<br>100<br>98 |
| CH$_3$O\P(=O)(NH-n-C$_4$H$_9$)-O-C(CH$_3$)=CH-SC$_2$H$_5$ | (54) | 0.1<br>0.01<br>0.001<br>0.0001 | 100<br>100<br>100<br>30 |
| C$_2$H$_5$O\P(=O)(NH-n-C$_4$H$_9$)-O-C(CH$_3$)=CH-S C$_2$H$_5$ | (55) | 0.1<br>0.01<br>0.001 | 100<br>100<br>99 |
| n-C$_3$H$_7$O\P(=O)(NH-n-C$_4$H$_9$)-O-C(CH$_3$)=CH-S C$_2$H$_5$ | (56) | 0.1<br>0.01<br>0.001 | 100<br>100<br>70 |
| i-C$_3$H$_7$O\P(=O)(NH-n-C$_4$H$_9$)-O-C(CH$_3$)=CH-S C$_2$H$_5$ | (57) | 0.1<br>0.01<br>0.001 | 100<br>100<br>70 |

TABLE 3—Continued

| Active compounds | | Concentration of active compound in percent by weight | Degree of destruction in percent after 1 day |
|---|---|---|---|
| $\begin{array}{c} CH_3O \\ \diagdown \\ i\text{-}C_4H_9\text{—}NH \end{array} \begin{array}{c} O \\ \| \\ P\text{—}O\text{—}C\text{=}CH\text{—}SC_2H_5 \\ | \\ CH_3 \end{array}$ | (72) | 0.1<br>0.01<br>0.001<br>0.0001 | 100<br>100<br>100<br>60 |
| $\begin{array}{c} C_2H_5O \\ \diagdown \\ i\text{-}C_4H_9\text{—}NH \end{array} \begin{array}{c} O \\ \| \\ P\text{—}O\text{—}C\text{=}CH\text{—}SC_2H_5 \\ | \\ CH_3 \end{array}$ | (73) | 0.1<br>0.01<br>0.001<br>0.0001 | 100<br>100<br>100<br>30 |
| $\begin{array}{c} n\text{-}C_3H_7O \\ \diagdown \\ i\text{-}C_4H_9\text{—}NH \end{array} \begin{array}{c} O \\ \| \\ P\text{—}O\text{—}C\text{=}CH\text{—}SC_2H_5 \\ | \\ CH_3 \end{array}$ | (74) | 0.1<br>0.01<br>0.001 | 100<br>100<br>80 |
| $\begin{array}{c} CH_3O \\ \diagdown \\ C_2H_5\text{—}CH\text{—}NH \\ | \\ CH_3 \end{array} \begin{array}{c} O \\ \| \\ P\text{—}O\text{—}C\text{=}CH\text{—}SC_2H_5 \\ | \\ CH_3 \end{array}$ | (76) | 0.1<br>0.01<br>0.001 | 100<br>100<br>40 |
| $\begin{array}{c} C_2H_5O \\ \diagdown \\ sec.\text{-}C_4H_9\text{—}NH \end{array} \begin{array}{c} O \\ \| \\ P\text{—}O\text{—}C\text{=}CH\text{—}SC_2H_5 \\ | \\ CH_3 \end{array}$ | (77) | 0.1<br>0.01<br>0.001 | 100<br>100<br>100 |
| $\begin{array}{c} n\text{-}C_3H_7O \\ \diagdown \\ C_2H_5\text{—}CH\text{—}NH \\ | \\ CH_3 \end{array} \begin{array}{c} O \\ \| \\ P\text{—}O\text{—}C\text{=}CH\text{—}SC_2H_5 \\ | \\ CH_3 \end{array}$ | (78) | 0.1<br>0.01<br>0.001 | 100<br>100<br>80 |
| $\begin{array}{c} i\text{-}C_3H_7O \\ \diagdown \\ C_2H_5\text{—}CH\text{—}NH \\ | \\ CH_3 \end{array} \begin{array}{c} O \\ \| \\ P\text{—}O\text{—}C\text{=}CH\text{—}SC_2H_5 \\ | \\ CH_3 \end{array}$ | (79) | 0.1<br>0.01<br>0.001 | 100<br>99<br>50 |
| $\begin{array}{c} CH_3O \\ \diagdown \\ (CH_3)_2N \end{array} \begin{array}{c} O \\ \| \\ P\text{—}O\text{—}C\text{=}CH\text{—}SC_2H_5 \\ | \\ CH_3 \end{array}$ | (80) | 0.1<br>0.01<br>0.001 | 100<br>100<br>95 |
| $\begin{array}{c} C_2H_5O \\ \diagdown \\ (CH_3)_2N \end{array} \begin{array}{c} O \\ \| \\ P\text{—}O\text{—}C\text{=}CH\text{—}SC_2H_5 \\ | \\ CH_3 \end{array}$ | (81) | 0.1<br>0.01<br>0.001 | 100<br>100<br>50 |
| $\begin{array}{c} n\text{-}C_3H_7O \\ \diagdown \\ (CH_3)_2N \end{array} \begin{array}{c} O \\ \| \\ P\text{—}O\text{—}C\text{=}CH\text{—}SC_2H_5 \\ | \\ CH_3 \end{array}$ | (82) | 0.1<br>0.01<br>0.001 | 100<br>100<br>90 |
| $\begin{array}{c} n\text{-}C_3H_7O \\ \diagdown \\ CH_2\text{=}CH\text{—}CH_2\text{—}NH \end{array} \begin{array}{c} O \\ \| \\ P\text{—}O\text{—}C\text{=}CH\text{—}SC_2H_5 \\ | \\ CH_3 \end{array}$ | (94) | 0.1<br>0.01<br>0.001 | 100<br>100<br>45 |
| $\begin{array}{c} i\text{-}C_3H_7O \\ \diagdown \\ CH_2\text{=}CH\text{—}CH_2\text{—}NH \end{array} \begin{array}{c} O \\ \| \\ P\text{—}O\text{—}C\text{=}CH\text{—}SC_2H_5 \\ | \\ CH_3 \end{array}$ | (95) | 0.1<br>0.01<br>0.001 | 100<br>100<br>45 |
| $\begin{array}{c} CH_3O \\ \diagdown \\ CH_3O\text{—}CH_2\text{—}CH_2\text{—}NH \end{array} \begin{array}{c} O \\ \| \\ P\text{—}O\text{—}C\text{=}CH\text{—}SC_2H_5 \\ | \\ CH_3 \end{array}$ | (97) | 0.1<br>0.01<br>0.001 | 100<br>100<br>65 |
| $\begin{array}{c} CH_3O \\ \diagdown \\ CH_3O(CH_2)_3NH \end{array} \begin{array}{c} O \\ \| \\ P\text{—}O\text{—}C\text{=}CH\text{—}SC_2H_5 \\ | \\ CH_3 \end{array}$ | (99) | 0.1<br>0.01<br>0.001 | 100<br>100<br>75 |
| $\begin{array}{c} C_2H_5O \\ \diagdown \\ CH_3O(CH_2)_3\text{—}NH \end{array} \begin{array}{c} O \\ \| \\ P\text{—}O\text{—}C\text{=}CH\text{—}SC_2H_5 \\ | \\ CH_3 \end{array}$ | (100) | 0.1<br>0.01<br>0.001 | 100<br>100<br>50 |
| $\begin{array}{c} CH_3O \\ \diagdown \\ C_6H_5\text{—}CH_2\text{—}NH \end{array} \begin{array}{c} O \\ \| \\ P\text{—}O\text{—}C\text{=}CH\text{—}SC_2H_5 \\ | \\ CH_3 \end{array}$ | (101) | 0.1<br>0.01<br>0.001 | 100<br>100<br>50 |

TABLE 3—Continued

| Active compounds | | Concentration of active compound in percent by weight | Degree of destruction in percent after 1 day |
|---|---|---|---|
| (structure 102) | (102) | 0.1<br>0.01<br>0.001 | 100<br>100<br>25 |
| (structure 104) | (104) | 0.1<br>0.01<br>0.001 | 100<br>100<br>30 |
| (structure 105) | (105) | 0.1<br>0.01<br>0.001 | 100<br>99<br>75 |
| (structure 109) | (109) | 0.1<br>0.01<br>0.001 | 100<br>100<br>30 |
| (structure 110) | (110) | 0.1<br>0.01<br>0.001 | 100<br>100<br>50 |
| (structure 111) | (111) | 0.1<br>0.01<br>0.001 | 100<br>100<br>70 |
| (structure 112) | (112) | 0.1<br>0.01<br>0.001 | 100<br>100<br>50 |
| (structure 113) | (113) | 0.1<br>0.01<br>0.001 | 100<br>100<br>70 |
| (structure 103) | (103) | 0.1<br>0.01<br>0.001 | 100<br>98<br>60 |

EXAMPLE 6

Rhopalosiphum test (systemic action)

Solvent: 3 parts by weight acetone
Emulsifier: 1 part by weight alkylarylpolyglycol ether To produce a suitable preparation of active compound, 1 part by weight of the active compound was mixed with the stated amount of solvent containing the stated amount of emulsifier and the concentrate was diluted with water to the desired concentration.

Oat plants (*Avena sativa*) which had been strongly infested with the bird cherry aphid (*Rhopalosiphum padi*) were watered with the preparation of the active compound so that the preparation penetrated into the soil without wetting the leaves of the oat plants. The active compound was taken up by the oat plants from the soil and thus reached the infested leaves.

After the specified periods of time, the degree of destruction was determined as a percentage: 100% means that all the aphids were killed whereas 0% means that none of the aphids were killed.

The active compounds, the concentrations of the active compounds, the evaluation times and the results can be seen from the following Table 4.

TABLE 4
(Rhopalosiphum test/syst.)

| Active compounds | | Concentration of active compound in percent by weight | Degree of destruction in percent after 4 days |
|---|---|---|---|
| $(iC_3H_7O)_2\overset{O}{\underset{\|}{P}}-O-C=CH-SC_3H_7-i$ with phenyl | (B) | 0.1 | 0 |

TABLE 4—Continued

| Active compounds | | Concentration of active compound in percent by weight | Degree of destruction in percent after 4 days |
|---|---|---|---|
| (known) | | | |
| $\begin{array}{c}CH_3O\\ \diagdown\\ CH_3-NH\end{array}\!\!\!\!\begin{array}{c}O\\ \|\\ P-O-C=CH-SCH_3\\ \phantom{P-O-}\|\\ \phantom{P-O-}CH_3\end{array}$ | (114) | 0.1<br>0.01<br>0.001 | 100<br>100<br>100 |
| $\begin{array}{c}CH_3O\\ \diagdown\\ C_2H_5-NH\end{array}\!\!\!\!\begin{array}{c}O\\ \|\\ P-O-C=CH-SCH_3\\ \phantom{P-O-}\|\\ \phantom{P-O-}CH_3\end{array}$ | (115) | 0.1<br>0.01<br>0.001 | 100<br>100<br>100 |
| $\begin{array}{c}CH_3O\\ \diagdown\\ i\text{-}C_3H_7-NH\end{array}\!\!\!\!\begin{array}{c}O\\ \|\\ P-O-C=CH-SCH_3\\ \phantom{P-O-}\|\\ \phantom{P-O-}CH_3\end{array}$ | (116) | 0.1<br>0.01<br>0.001 | 100<br>100<br>50 |
| $\begin{array}{c}CH_3\\ \|\\ C_2H_5-CH-O\\ \diagdown\\ H_2N\end{array}\!\!\!\!\begin{array}{c}\\ O\\ \|\\ P-O-C=CH-SC_2H_5\\ \phantom{P-O-}\|\\ \phantom{P-O-}CH_3\end{array}$ | (5) | 0.1<br>0.01 | 100<br>100 |
| $\begin{array}{c}CH_3O\\ \diagdown\\ CH_3-NH\end{array}\!\!\!\!\begin{array}{c}O\\ \|\\ P-O-C=CH-SC_2H_5\\ \phantom{P-O-}\|\\ \phantom{P-O-}CH_3\end{array}$ | (10) | 0.1<br>0.01<br>0.001<br>0.0001 | 100<br>100<br>100<br>40 |
| $\begin{array}{c}C_2H_5O\\ \diagdown\\ CH_3-NH\end{array}\!\!\!\!\begin{array}{c}O\\ \|\\ P-O-C=CH-SC_2H_5\\ \phantom{P-O-}\|\\ \phantom{P-O-}CH_3\end{array}$ | (11) | 0.1<br>0.01<br>0.001<br>0.0001 | 100<br>100<br>100<br>80 |
| $\begin{array}{c}i\text{-}C_3H_7O\\ \diagdown\\ CH_3-NH\end{array}\!\!\!\!\begin{array}{c}O\\ \|\\ P-O-C=CH-SC_2H_5\\ \phantom{P-O-}\|\\ \phantom{P-O-}CH_3\end{array}$ | (17) | 0.1<br>0.01<br>0.001 | 100<br>100<br>100 |
| $\begin{array}{c}CH_3O\\ \diagdown\\ C_2H_5-NH\end{array}\!\!\!\!\begin{array}{c}O\\ \|\\ P-O-C=CH-SC_2H_5\\ \phantom{P-O-}\|\\ \phantom{P-O-}CH_3\end{array}$ | (31) | 0.1<br>0.01<br>0.001 | 100<br>100<br>100 |
| $\begin{array}{c}CH_3O-CH_2-CH_2O\\ \diagdown\\ C_2H_5-NH\end{array}\!\!\!\!\begin{array}{c}O\\ \|\\ P-O-C=CH-SC_2H_5\\ \phantom{P-O-}\|\\ \phantom{P-O-}CH_3\end{array}$ | (34) | 0.1<br>0.01<br>0.001 | 100<br>100<br>30 |
| $\begin{array}{c}C_2H_5O\\ \diagdown\\ n\text{-}C_3H_7-NH\end{array}\!\!\!\!\begin{array}{c}O\\ \|\\ P-O-C=CH-SC_2H_5\\ \phantom{P-O-}\|\\ \phantom{P-O-}CH_3\end{array}$ | (49) | 0.1<br>0.01<br>0.001<br>0.0001 | 100<br>100<br>100<br>100 |
| $\begin{array}{c}CH_3O\\ \diagdown\\ (CH_3)_2CH-NH\end{array}\!\!\!\!\begin{array}{c}O\\ \|\\ P-O-C=CH-SC_2H_5\\ \phantom{P-O-}\|\\ \phantom{P-O-}CH_3\end{array}$ | (58) | 0.1<br>0.01<br>0.001<br>0.0001 | 100<br>100<br>100<br>80 |
| $\begin{array}{c}C_2H_5O\\ \diagdown\\ (CH_3)_2CH-NH\end{array}\!\!\!\!\begin{array}{c}O\\ \|\\ P-O-C=CH-SC_2H_5\\ \phantom{P-O-}\|\\ \phantom{P-O-}CH_3\end{array}$ | (59) | 0.1<br>0.01<br>0.001 | 100<br>100<br>100 |
| $\begin{array}{c}CH_3O-CH_2-CH_2-O\\ \diagdown\\ i\text{-}C_3H_7NH\end{array}\!\!\!\!\begin{array}{c}O\\ \|\\ P-O-C=CH-SC_2H_5\\ \phantom{P-O-}\|\\ \phantom{P-O-}CH_3\end{array}$ | (60) | 0.1<br>0.01 | 100<br>100 |
| $\begin{array}{c}n\text{-}C_3H_7O\\ \diagdown\\ (CH_3)_2CH-NH\end{array}\!\!\!\!\begin{array}{c}O\\ \|\\ P-O-C=CH-SC_2H_5\\ \phantom{P-O-}\|\\ \phantom{P-O-}CH_3\end{array}$ | (61) | 0.1<br>0.01<br>0.001<br>0.0001 | 100<br>100<br>100<br>80 |
| $\begin{array}{c}i\text{-}C_3H_7O\\ \diagdown\\ i\text{-}C_3H_7-NH\end{array}\!\!\!\!\begin{array}{c}O\\ \|\\ P-O-C=CH-SC_2H_5\\ \phantom{P-O-}\|\\ \phantom{P-O-}CH_3\end{array}$ | (62) | 0.1<br>0.01<br>0.001 | 100<br>100<br>100 |
| $\begin{array}{c}CH_2=CH-CH_2O\\ \diagdown\\ i\text{-}C_3H_7-NH\end{array}\!\!\!\!\begin{array}{c}O\\ \|\\ P-O-C=CH-SC_2H_5\\ \phantom{P-O-}\|\\ \phantom{P-O-}CH_3\end{array}$ | (63) | 0.1<br>0.01 | 100<br>100 |

TABLE 4—Continued

| Active compounds | | Concentration of active compound in percent by weight | Degree of destruction in percent after 4 days |
|---|---|---|---|
| $\text{n-C}_4\text{H}_9\text{O}\diagdown\underset{\underset{(CH_3)_2CH-NH}{|}}{\overset{\overset{O}{\parallel}}{P}}-O-\underset{\underset{CH_3}{|}}{C}=CH-SC_2H_5$ | (64) | 0.1<br>0.01 | 100<br>100 |
| $\text{i-C}_3\text{H}_7\text{O}\diagdown\underset{\underset{\text{i-C}_4\text{H}_9-NH}{|}}{\overset{\overset{O}{\parallel}}{P}}-O-\underset{\underset{CH_3}{|}}{C}=CH-SC_2H_5$ | (75) | 0.1<br>0.01 | 100<br>100 |
| $\text{C}_2\text{H}_5\text{O}\diagdown\underset{\underset{\text{sec-}C_4H_9-NH}{|}}{\overset{\overset{O}{\parallel}}{P}}-O-\underset{\underset{CH_3}{|}}{C}=CH-SC_2H_5$ | (77) | 0.1<br>0.01<br>0.001 | 100<br>100<br>99 |
| $\text{CH}_3\text{O}\diagdown\underset{\underset{(CH_3)_2N}{|}}{\overset{\overset{O}{\parallel}}{P}}-O-\underset{\underset{CH_3}{|}}{C}=CH-SC_2H_5$ | (80) | 0.1<br>0.01<br>0.001 | 100<br>100<br>100 |
| $\text{CH}_3\text{O}\diagdown\underset{\underset{(C_2H_5)_2N}{|}}{\overset{\overset{O}{\parallel}}{P}}-O-\underset{\underset{CH_3}{|}}{C}=CH-SC_2H_5$ | (84) | 0.1<br>0.01<br>0.001 | 100<br>100<br>40 |
| $\text{C}_2\text{H}_5\text{O}\diagdown\underset{\underset{(C_2H_5)_2N}{|}}{\overset{\overset{O}{\parallel}}{P}}-O-\underset{\underset{CH_3}{|}}{C}=CH-SC_2H_5$ | (85) | 0.1<br>0.01 | 100<br>100 |
| $\text{CH}_3\text{O}\diagdown\underset{\underset{(n-C_3H_7)_2N}{|}}{\overset{\overset{O}{\parallel}}{P}}-O-\underset{\underset{CH_3}{|}}{C}=CH-SC_2H_5$ | (90) | 0.1<br>0.01<br>0.001 | 100<br>100<br>100 |
| $\text{C}_2\text{H}_5\text{O}\diagdown\underset{\underset{(n-C_3H_7)_2N}{|}}{\overset{\overset{O}{\parallel}}{P}}-O-\underset{\underset{CH_3}{|}}{C}=CH-SC_2H_5$ | (91) | 0.1<br>0.01 | 100<br>100 |
| $\text{CH}_3\text{O}\diagdown\underset{\underset{CH_2=CH-CH_2-NH}{|}}{\overset{\overset{O}{\parallel}}{P}}-O-\underset{\underset{CH_2}{|}}{C}=CH-SC_2H_5$ | (92) | 0.1<br>0.01<br>0.001 | 100<br>100<br>100 |
| $\text{C}_2\text{H}_5\text{O}\diagdown\underset{\underset{CH_2=CH-CH_2-NH}{|}}{\overset{\overset{O}{\parallel}}{P}}-O-\underset{\underset{CH_3}{|}}{C}=CH-SC_2H_5$ | (93) | 0.1<br>0.01<br>0.001 | 100<br>100<br>100 |
| $\text{sec.-C}_4\text{H}_9\text{O}\diagdown\underset{\underset{CH_2=CH-CH_2-NH}{|}}{\overset{\overset{O}{\parallel}}{P}}-O-\underset{\underset{CH_3}{|}}{C}=CH-SC_2H_5$ | (96) | 0.1<br>0.01 | 100<br>100 |
| $\text{CH}_3\text{O}\diagdown\underset{\underset{CH_3O-CH_2-CH_2-NH}{|}}{\overset{\overset{O}{\parallel}}{P}}-O-\underset{\underset{CH_3}{|}}{C}=CH-SC_2H_5$ | (97) | 0.1<br>0.01<br>0.001<br>0.0001 | 100<br>100<br>100<br>30 |
| $\text{C}_2\text{H}_5\text{O}\diagdown\underset{\underset{CH_3O-CH_2-CH_2-NH}{|}}{\overset{\overset{O}{\parallel}}{P}}-O-\underset{\underset{CH_3}{|}}{C}=CH-SC_2H_5$ | (98) | 0.1<br>0.01<br>0.001 | 100<br>100<br>40 |
| $\text{CH}_3\text{O}\diagdown\underset{\underset{\text{(pyrrolidinyl)}}{}}{\overset{\overset{O}{\parallel}}{P}}-O-\underset{\underset{CH_3}{|}}{C}=CH-SC_2H_5$ | (107) | 0.1<br>0.01<br>0.001 | 100<br>100<br>100 |
| $\text{C}_2\text{H}_5\text{O}\diagdown\underset{\underset{\text{(pyrrolidinyl)}}{}}{\overset{\overset{O}{\parallel}}{P}}-O-\underset{\underset{CH_3}{|}}{C}=CH-SC_2H_5$ | (108) | 0.1<br>0.01 | 100<br>98 |
| $\text{CH}_3\text{O}\diagdown\underset{\underset{\text{(piperidinyl)}}{}}{\overset{\overset{O}{\parallel}}{P}}-O-\underset{\underset{CH_3}{|}}{C}=CH-SC_2H_5$ | (103) | 0.1<br>0.01<br>0.001 | 100<br>100<br>70 |

EXAMPLE 7

Tetranychus test (resistant)

Solvent: 3 parts by weight acetone
Emulsifier: 1 part by weight alkylarylpolyglycol ether To produce a suitable preparation of active compound, 1 part by weight of the active compound was mixed with the stated amount of solvent containing the stated amount of emulsifier and the concentrate so obtained was diluted with water to the desired concentration.

Bean plants (*Phaseolus vulgaris*), which had a height of approximately 10-30 cm., were sprayed with the preparation of the active compound until dripping wet. These bean plants were heavily infested with the two-spotted spider mite (*Tetranychus urticae*) in all stages of development.

After the specified periods of time, the effectiveness of the preparation of active compound was determined by counting the dead mites. The degree of destruction thus obtained was expressed as a percentage: 100% means that all the spider mites were killed whereas 0% means that none of the spider mites were killed.

The active compounds, the concentrations of the active compounds, the evaluation times and the results can be seen from the following Table 5.

TABLE 5
(Tetranychus test/resistant)

| Active compounds | | Concentration of active compound in percent by weight | Degree of destruction in percent after 2 days |
|---|---|---|---|
| $(i\text{-}C_3H_7O)_2\overset{O}{\overset{\|}{P}}\text{-}O\text{-}C(CH_3)=CH\text{-}S\,CH_3$ (known) | (C) | 0.1 | 0 |
| $(i\text{-}C_3H_7O)_2\overset{O}{\overset{\|}{P}}\text{-}O\text{-}C(CH_3)=CH\text{-}S\,C_3H_7\text{-}i$ (known) | (A) | 0.1 | 0 |
| $(i\text{-}C_3H_7O)_2\overset{O}{\overset{\|}{P}}\text{-}O\text{-}C(C_6H_5)=CH\text{-}S\,C_3H_7\text{-}i$ (known) | (B) | 0.1 | 0 |
| $\begin{array}{c}CH_3O\\CH_3\text{-}NH\end{array}\!\!\!\!\!>\!\!P(=O)\text{-}O\text{-}C(CH_3)=CH\text{-}S\,CH_3$ | (114) | 0.1 | 100 |
| $\begin{array}{c}CH_3O\\C_2H_5\text{-}NH\end{array}\!\!\!\!\!>\!\!P(=O)\text{-}O\text{-}C(CH_3)=CH\text{-}S\,CH_3$ | (115) | 0.1 | 100 |
| $\begin{array}{c}CH_3O\\i\text{-}C_3H_7\text{-}NH\end{array}\!\!\!\!\!>\!\!P(=O)\text{-}O\text{-}C(CH_3)=CH\text{-}S\,CH_3$ | (116) | 0.1<br>0.01 | 100<br>90 |
| $\begin{array}{c}C_2H_5O\\H_2N\end{array}\!\!\!\!\!>\!\!P(=O)\text{-}O\text{-}C(CH_3)=CH\text{-}S\,C_2H_5$ | (1) | 0.1<br>0.01 | 100<br>40 |
| $\begin{array}{c}n\text{-}C_3H_7O\\H_2N\end{array}\!\!\!\!\!>\!\!P(=O)\text{-}O\text{-}C(CH_3)=CH\text{-}SC_2H_5$ | (2) | 0.1 | 100 |
| $\begin{array}{c}i\text{-}C_3H_7O\\H_2N\end{array}\!\!\!\!\!>\!\!P(=O)\text{-}O\text{-}C(CH_3)=CH\text{-}SC_2H_5$ | (3) | 0.1<br>0.01 | 100<br>30 |
| $\begin{array}{c}n\text{-}C_4H_9O\\H_2N\end{array}\!\!\!\!\!>\!\!P(=O)\text{-}O\text{-}C(CH_3)=CH\text{-}SC_2H_5$ | (4) | 0.1 | 100 |
| $\begin{array}{c}CH_2=CH\text{-}CH_2O\\CH_3\text{-}NH\end{array}\!\!\!\!\!>\!\!P(=O)\text{-}O\text{-}C(CH_3)=CH\text{-}SC_2H_5$ | (18) | 0.1 | 100 |

TABLE 5 — Continued

| Active compounds | | Concentration of active compound in percent by weight | Degree of destruction in percent after 2 days |
|---|---|---|---|
| $\begin{array}{c}CH_3O\phantom{xx}O\\ \diagdown\phantom{x}\|\\ P-O-C=CH-SC_2H_5\\ \diagup\phantom{xxxxx}\|\\ C_2H_5-NH\phantom{xx}CH_3\end{array}$ | (31) | 0.1 | 100 |
| $\begin{array}{c}C_2H_5O\phantom{xx}O\\ \diagdown\phantom{x}\|\\ P-O-C=CH-SC_2H_5\\ \diagup\phantom{xxxxx}\|\\ C_2H_5-NH\phantom{xx}CH_3\end{array}$ | (32) | 0.1 | 100 |
| $\begin{array}{c}CH_3O\phantom{xx}O\\ \diagdown\phantom{x}\|\\ P-O-C=CH-SC_2H_5\\ \diagup\phantom{xxxxx}\|\\ (CH_3)_2CH-NH\phantom{xx}CH_3\end{array}$ | (58) | 0.1 | 100 |
| $\begin{array}{c}CH_3O\phantom{xx}O\\ \diagdown\phantom{x}\|\\ P-O-C=CH-SC_2H_5\\ \diagup\phantom{xxxxx}\|\\ (CH_3)_2N\phantom{xx}CH_3\end{array}$ | (80) | 0.1<br>0.01 | 95<br>50 |
| $\begin{array}{c}CH_3O\phantom{xx}O\\ \diagdown\phantom{x}\|\\ P-O-C=CH-S\,C_2H_5\\ \diagup\phantom{xxxxx}\|\\ (C_2H_5)_2N\phantom{xx}CH_3\end{array}$ | (84) | 0.1 | 100 |
| $\begin{array}{c}CH_3O\phantom{xx}O\\ \diagdown\phantom{x}\|\\ P-O-C=CH-S\,C_2H_5\\ \diagup\phantom{xxxxx}\|\\ CH_2=CH-CH_2-NH\phantom{xx}CH_3\end{array}$ | (92) | 0.1 | 100 |
| $\begin{array}{c}C_2H_5O\phantom{xx}O\\ \diagdown\phantom{x}\|\\ P-O-C=CH-S\,C_2H_5\\ \diagup\phantom{xxxxx}\|\\ CH_2=CH-CH_2-NH\phantom{xx}CH_3\end{array}$ | (93) | 0.1 | 100 |
| $\begin{array}{c}C_2H_5O\phantom{xx}O\\ \diagdown\phantom{x}\|\\ P-O-C=CH-S\,C_2H_5\\ \diagup\phantom{xxxxx}\|\\ CH_3O-CH_2-CH_2-NH\phantom{xx}CH_3\end{array}$ | (98) | 0.1 | 100 |
| $\begin{array}{c}C_2H_5O\phantom{xx}O\\ \diagdown\phantom{x}\|\\ P-O-C=CH-S\,C_2H_5\\ \diagup\phantom{xxxxx}\|\\ \text{cyclohexyl-}N\phantom{xx}CH_3\\ H\end{array}$ | (104) | 0.1 | 100 |
| $\begin{array}{c}CH_3O\phantom{xx}O\\ \diagdown\phantom{x}\|\\ P-O-C=CH-S\,C_2H_5\\ \diagup\phantom{xxxxx}\|\\ \text{morpholino}\phantom{xx}CH_3\end{array}$ | (105) | 0.1<br>0.01 | 98<br>50 |
| $\begin{array}{c}CH_3O\phantom{xx}O\\ \diagdown\phantom{x}\|\\ P-O-C=CH-S\,C_2H_5\\ \diagup\phantom{xxxxx}\|\\ \text{pyrrolidino}\phantom{xx}CH_3\end{array}$ | (107) | 0.1<br>0.01 | 99<br>80 |
| $\begin{array}{c}C_2H_5O\phantom{xx}O\\ \diagdown\phantom{x}\|\\ P-O-C=CH-S\,C_4H_9\text{-}n\\ \diagup\phantom{xxxxx}\|\\ CH_3-NH\phantom{xx}CH_3\end{array}$ | (110) | 0.1 | 100 |
| $\begin{array}{c}CH_3O\phantom{xx}O\\ \diagdown\phantom{x}\|\\ P-O-C=CH-S\,C_4H_9\text{-}n\\ \diagup\phantom{xxxxx}\|\\ i\text{-}C_3H_7-NH\phantom{xx}CH_3\end{array}$ | (111) | 0.1 | 100 |
| $\begin{array}{c}C_2H_5O\phantom{xx}O\\ \diagdown\phantom{x}\|\\ P-O-C=CH-S\,C_4H_9\text{-}n\\ \diagup\phantom{xxxxx}\|\\ i\text{-}C_3H_7-NH\phantom{xx}CH_3\end{array}$ | (112) | 0.1 | 100 |

It will be appreciated that the instant specification and examples are set forth by way of illustration and not limitation, and that various modifications and changes may be made without departing from the spirit and scope of the present invention.

What is claimed is:

1. An O-(1-methyl-2-alkylmercapto-vinyl)- phosphoric acid ester amide of the formula

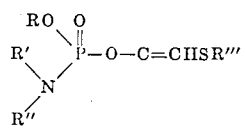

in which
R is alkyl of up to 12 carbon atoms optionally substituted by phenyl or cycloalkyl or cyclo-alkenyl of 5 or 6 carbon atoms, halo-lower alkyl, alkoxyalkyl of up to 6 carbon atoms in each alkyl radical, alkenyl of up to 6 carbon atoms, phenyl, cycloalkyl or cycloalkenyl of 5 or 6 carbon atoms,
R''' is alkyl of up to 6 carbon atoms, and R' and R'' each independently is hydrogen, lower alkyl optionally substituted by phenyl or cycloalkyl of 5 or 6 carbon atoms, lower alkenyl, alkoxyalkyl of up to 6 carbon atoms in each alkyl radical, phenyl, or cycloalkyl of 5 or 6 carbon atoms.

2. A compound according to claim 1 in which R is straight-chain or branched alkyl with 1 to 10 carbon atoms, chloroethyl, allyl, lower alkoxy-lower alkyl, phenyl, phenyl-lower alkyl cyclopentyl, cyclohexyl, cyclohexylmethyl, cyclohexylethyl or cylohex(1)en-4-yl-methyl, R' and R'' are hydrogen, straight-chain or branched alkyl with 1 to 4 carbon atoms, allyl, methoxyethyl, methoxypropyl, ethoxypropyl, ethoxyethyl, propoxyethyl, phenyl, benzyl, cyclohexyl or cyclohexylmethyl, and R''' is straight-chain or branched lower alkyl.

3. The compound according to claim 1 wherein such compound is O-methyl-O-(1-methyl-2-ethylmercapto-vinyl)-phosphoric acid ester N-methylamide of the formula

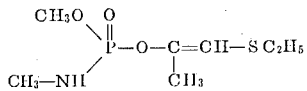

4. The compound according to claim 1 wherein such compound is O-methyl-O-(1-methyl-2-methylmercapto-vinyl)phosphoric acid ester N-methylamide of the formula

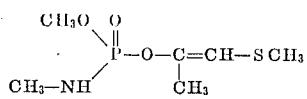

5. The compound according to claim 1 wherein such compound is O-methyl-O-(1-methyl-2-methylmercapto-vinyl)-phosphoric acid ester N-ethylamide of the formula

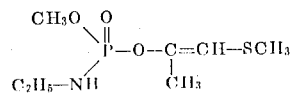

6. The compound according to claim 1 wherein such compound is O-ethyl-O-(1-methyl-2-ethylmercapto-vinyl)phosphoric acid ester N-sec.-butylamide of the formula

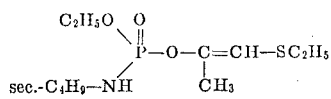

7. The compound according to claim 1 wherein such compound is O-methyl-O-(1-methyl-2-ethylmercapto-vinyl)-phosphoric acid ester N-allylamide of the formula

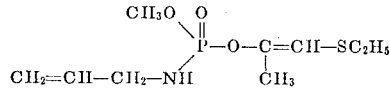

* * * * *